United States Patent [19]
Tsai

[11] Patent Number: 5,267,768
[45] Date of Patent: Dec. 7, 1993

[54] CEILING-MOUNTED RETRACTABLE GLARE SHADING BOARD FOR AUTOMOBILE

[76] Inventor: Hwang-Change Tsai, No. 120-16, Chiao Tsai Liao, Ting Liao Li, Chiayi City, Taiwan

[21] Appl. No.: 945,252

[22] Filed: Sep. 15, 1992

[51] Int. Cl.$^5$ .............................................. B60J 3/02
[52] U.S. Cl. ................................. 296/97.8; 296/97.4; 296/97.11
[58] Field of Search ........ 296/97.4, 97.8, 97.11–97.13, 296/97.9; 160/DIG. 3, 370.2

[56] References Cited

U.S. PATENT DOCUMENTS

| | | | |
|---|---|---|---|
| 4,679,842 | 7/1987 | Hwang-Change | 296/97.11 |
| 4,848,827 | 7/1989 | Ou | 160/370.2 X |
| 4,989,910 | 2/1991 | Mersman et al. | 296/97.4 |

FOREIGN PATENT DOCUMENTS

0210122   9/1987   Japan ................. 296/97.4

*Primary Examiner*—Dennis H. Pedder
*Attorney, Agent, or Firm*—Bacon & Thomas

[57] ABSTRACT

An improved ceiling-mounted retractable glare shading board particularly adapted for use in an automobile is made up of a flexible slide plate assembly, a pivotal glare shading board and a guide bracket wherein the slide plate assembly has a pair of guide plates and a board securing plate; and the glare shading board includes a main board and a pair of pivotal side wings; and the guide bracket has an upper and lower fixing board, a hollow guide board sandwiched between the fixing boards and having a pair of parallel side edges that are in limiting abutment against the cable rollers mounted to the flexible slide plate assembly and the cable rollers are further in contact with a cross wound cable so as to permit the plate assembly to smoothly travel therealong; a pulley disposed at each corner and between the fixing boards and the wound cable. The present glare shading board is pivotally secured to the board securing plate of the slide plate assembly so that the glare shading board can be retractably extended and received by way of the slidable operation on the flexible slide plate assembly. The present retractable glare shading board can be mounted unto any curved ceiling of an automobile and operated without getting stuck.

6 Claims, 10 Drawing Sheets

CEILING-MOUNTED RETRACTABLE GLARE SHADING BOARD FOR AUTOMOBILE

BACKGROUND OF THE INVENTION

The present invention relates to an improved ceiling mounted retractable glare shading board which is characterized in that the pivotal glare shading board is attached to a flexible slide plate assembly which is movably engaged with a hollow guide board and a cross wound cable. The plate assembly is able to be pulled forward or pushed backward along the parallel side edges of the hollow guide board of a guide bracket and the cross wound cable so as to facilitate the location of the pivotal glare shading board behind the windshield whereby the operation space thereof can be minimized and it can be received easily and be operated on a curved automobile ceiling smoothly.

In the U.S. Pat. No. 4,679,842 of the present inventor, there are a number of disadvantages found which are given as below:
1. The guide track thereof is disposed overhead above the driver's seat and a driver's head is apt to be accidently hurt thereby.
2. The two glare shading boards have to be located and retracted separately, making the operation thereof inconvenient.
3. The sliding of the glare shading boards along the guide track is not sufficiently smooth and the boards may easily get stuck or fall off the rails in operation.
4. The twin glare shading boards are space occupying as a result of some portion thereof being overlapped.
5. It can not be fitted onto a curved ceiling of a vehicle.

SUMMARY OF THE INVENTION

The primary object of the present invention is to provide an improved ceiling mounted and retractable glare shading board for use in an automobile which is secured to the ceiling of the same at such a position that it will not interfere with the entrance of a driver.

Another object of the present invention is to provide a one-piece glare shading board which can be pulled downwardly to cover the whole windshield and lifted upwardly therefrom in a single operation with ease so as to facilitate the operation thereof.

One further object of the present invention is to provide an improved glare shading board which is provided with resilient abutment pieces, pulleys, flexible slide plate assembly, cable rollers in association with a cross wound cable so as to permit the glare shading board to move smoothly along the guide bracket even attached to a curved ceiling of an automobile without getting stuck.

BRIEF DESCRIPTION OF THE DRAWINGS

FIG. 10A to FIG. 10E are diagrams showing the operational engagement of the hollow guide board and the cable rollers;

DETAILED DESCRIPTION OF THE PREFERRED EMBODIMENT

Figure 1:
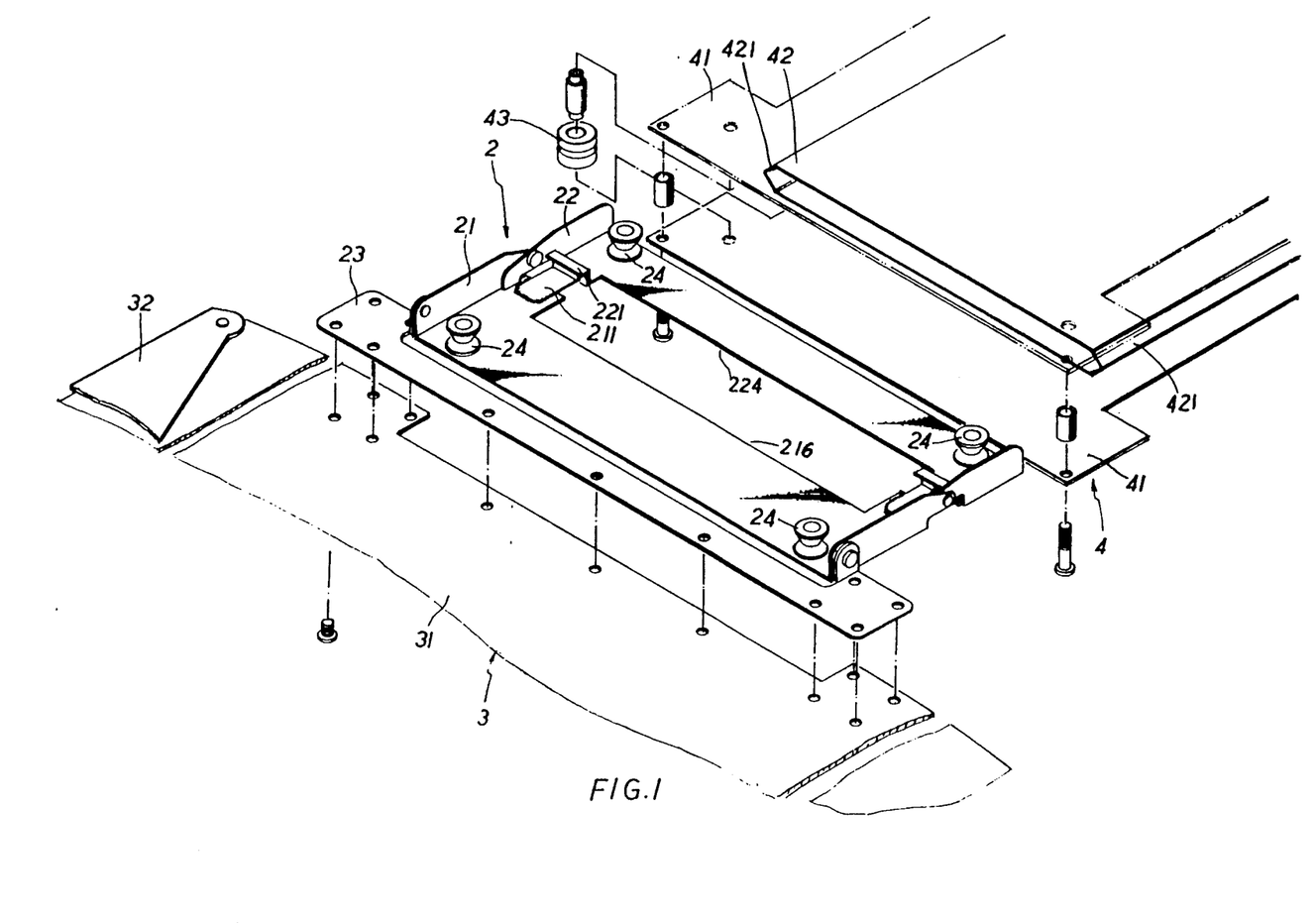
FIG. 1 is a perspective diagram showing the exploded components of the present invention.
Figure 2:
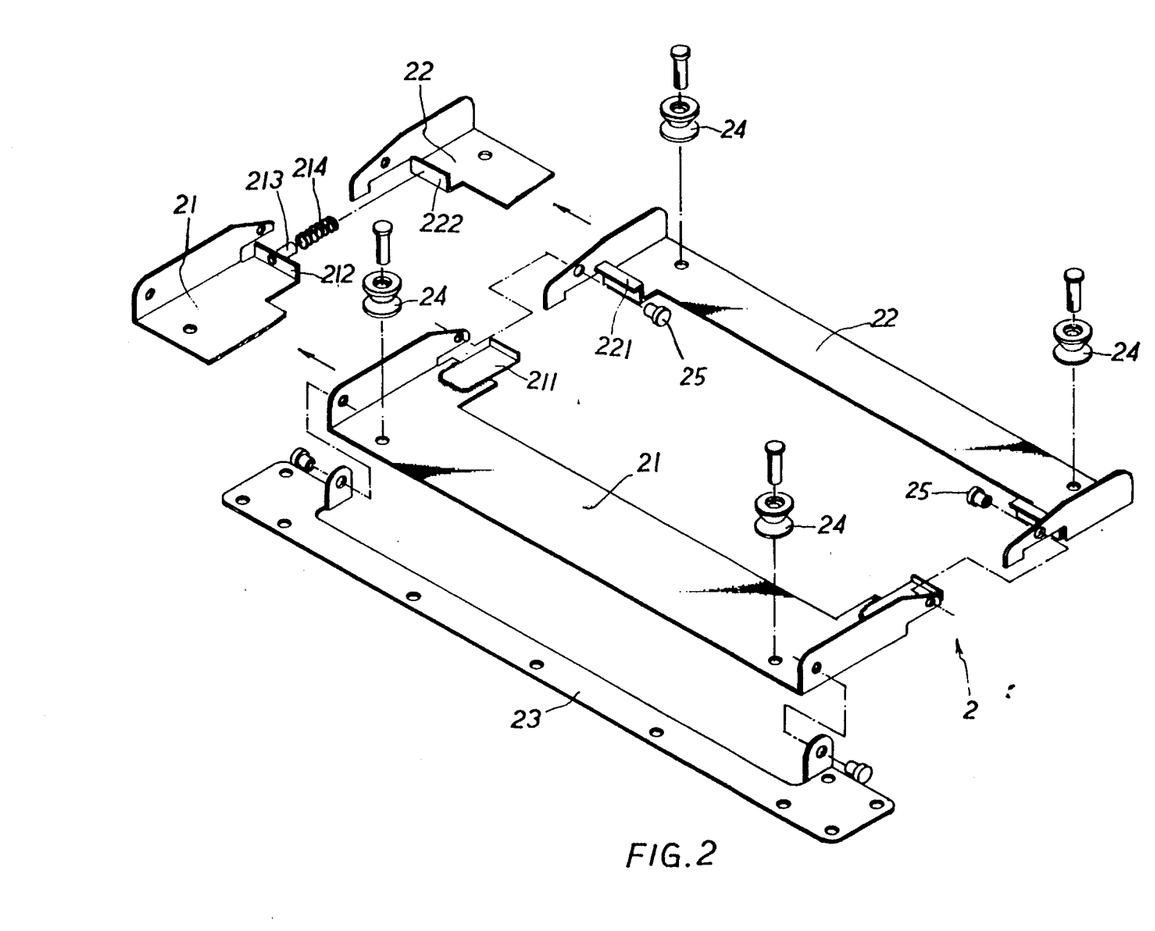
FIG. 2 is a perspective diagram showing the exploded flexible slide plate assembly.
Figure 3:
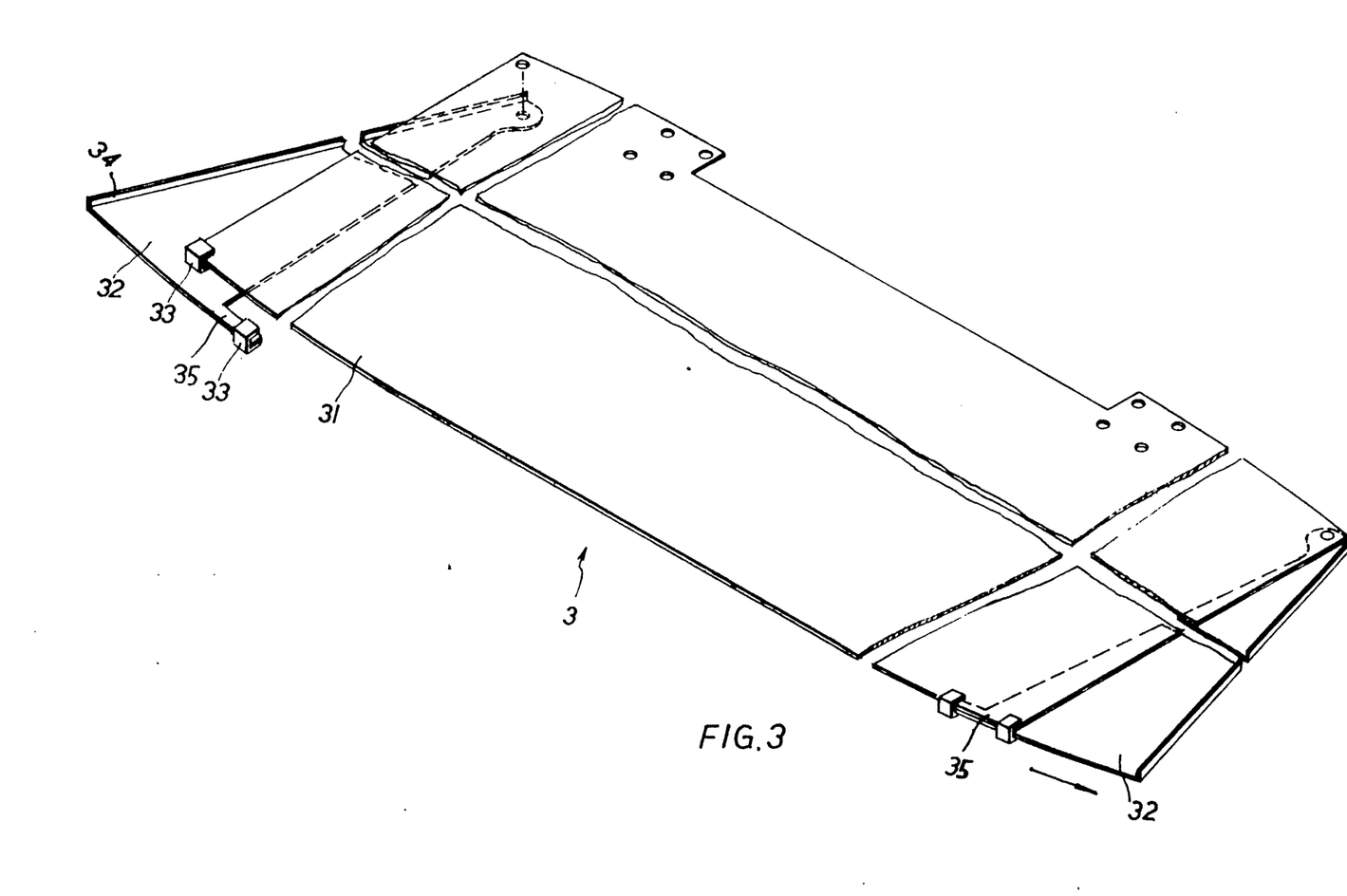
FIG. 3 is a diagram showing the glare shading board.

Referring to FIGS. 1, 2 and 3, the present invention is mainly comprised of a flexible slide plate assembly 2, a glare shading board 3 and a guide bracket 4. The flexible slide plate assembly 2 includes a pair of C - shaped guide plates 21, 22 that are pivotally coupled to each other and a recessed cut 216 and 224 is disposed on one side of the guide plates 21 and 22 respectively with the cuts facing each other; at each corner of the opposite side to the side with the recessed cut, the guide plates 21 and 22 are provided with a cable roller 24; a resilient abutment piece 211 is secured to each corner opposite to each cable roller 24. A right angled stop flange 221 with which each resilient abutment piece 211 is limitedly engaged is disposed at each corner of the guide plate 22 opposite to each cable roller 24 thereon whereby the guide plates 21, 22 are prevented from being pivoted upwardly about the coupling hinge pins 25 and are only able to be pivoted downwardly. With the help of the resilient abutment pieces 211, the guide plates 21, 22 are able to move smoothly in a curved sliding track adapted for a curved ceiling; and the recessed cuts 216, 224 enable the guide plates 21, 22 to be more adaptable to a curved track and to move without abutting against the hollow guide board 42. A securing plate 23 is pivotally fixed to one side of the guide plate 21 so as to permit the glare shading board 3 to be attached thereto.

The glare shading board 3 is comprised of a main board 31 and a pair of side wings 32; at each corner of the front side of the main board 31 is disposed a C-shaped retaining clamp 33. Each side wing 32 is made in a triangular shape and is pivotally secured to the main board 31 with its pinnacle, as shown in FIG. 3. The side wing 32 is provided with a stop flange 34 at the outer edge thereof so as to limit the pivot of the side wing 32. Another retaining clamp 33 is secured to an extended leg 35 of the side wing 32 so that the same can be engaged with the main board 31 when not used.

Figure 4:
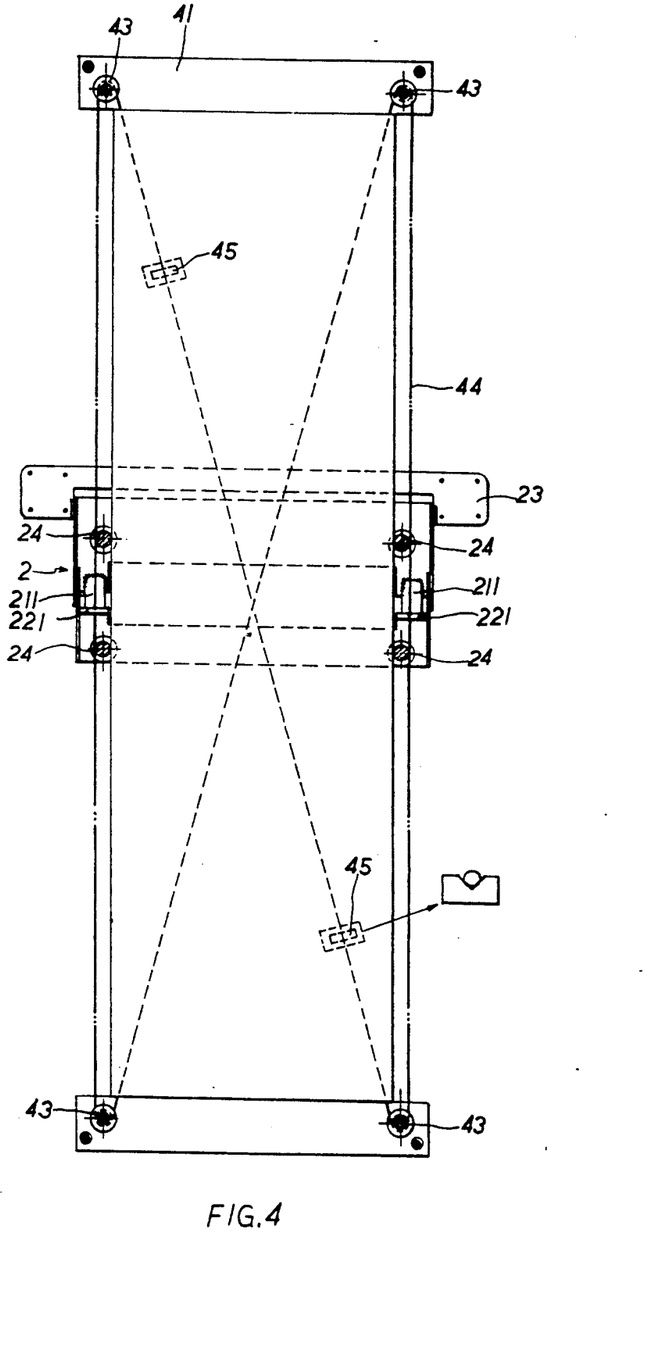
FIG. 4 is a diagram showing the cross arrangement of the cable and the location of the cable rollers.
Figure 6:
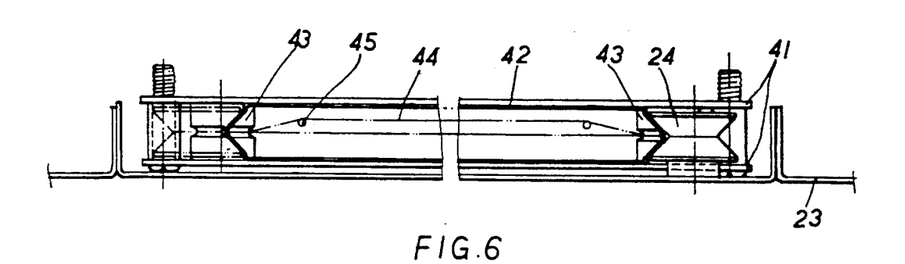
FIG. 6 is a sectional diagram showing the arrangement of the flexible slide plate assembly and the guide bracket of the present invention.
Figure 7:
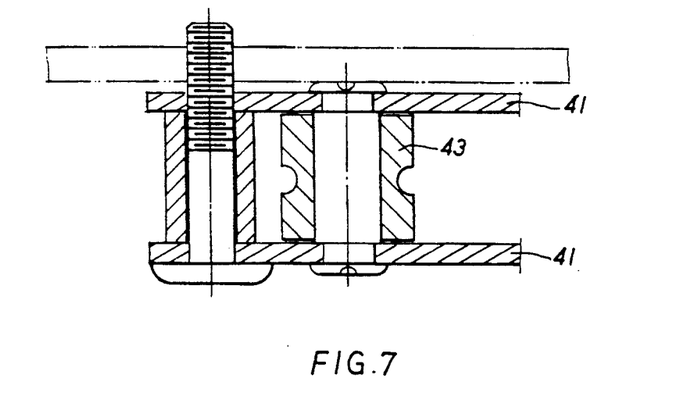
FIG. 7 is a sectional diagram showing the structure of a cable roller thereof.

Referring to FIGS. 4, 6, the bracket 4 is comprised of an upper and a lower fixing board 41, a hollow guide board 42, a number of cable pulleys 43 and a cable 44. The hollow guide board 42 is sandwiched by the upper and lower fixing boards 41 that are secured to the ceiling of an automobile by screws. The cable pulleys 43 are rotatably fixed at each corner and between the upper and lower fixing boards 41, as shown in FIG. 7, and the cable 44 is wound around the hollow guide board 42 by way of the cable pulleys 43 and the cable 44 is cross wound into form so as to permit the flexible slide attachment assembly 2 to be moved smoothly with the guide rollers 24 thereof in abutment against the cross wound cable 44 and the side edges of the hollow guide board 42. To avoid the cross wound cable to be in frictional contact with each other, a pair of cable supporting seats 45 are used, as shown in FIG. 4.

Figure 5:
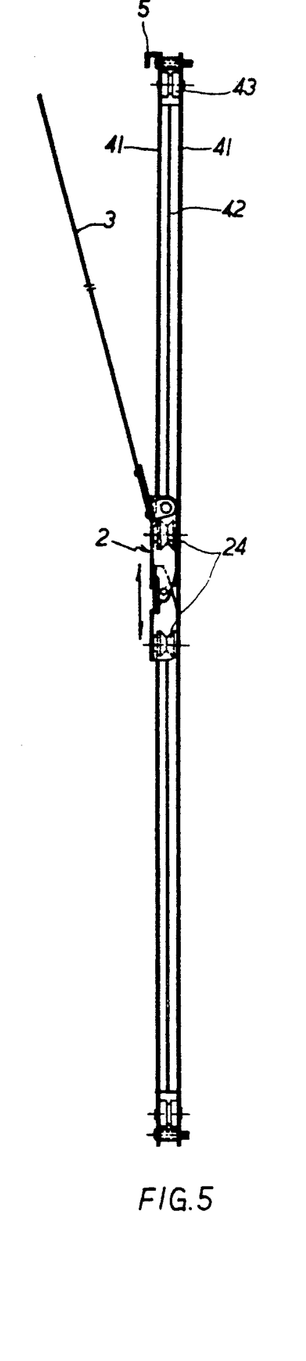
FIG. 5 is a diagram showing the operation of the flexible slide plate assembly.
Figure 8:
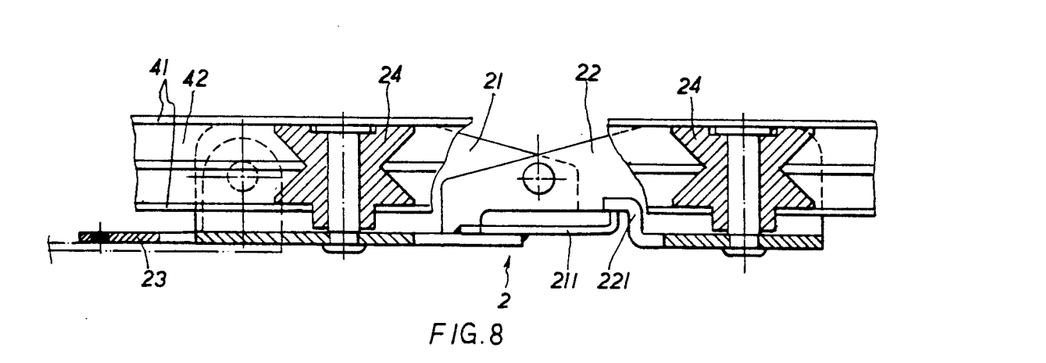
FIG. 8 is a sectional diagram showing the structural connection of the flexible slide plate assembly.
Figure 9:
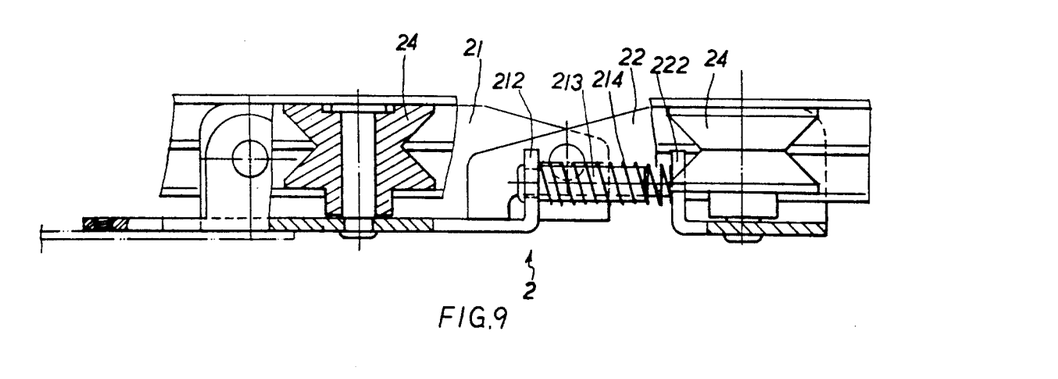
FIG. 9 is a sectional diagram showing another structural connection of the flexible slide plate assembly.
Figure 10:
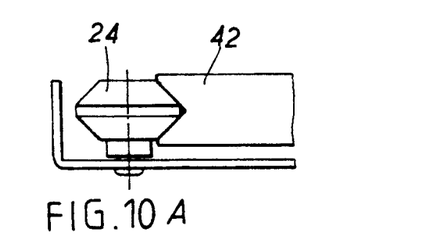
Figure 10C:
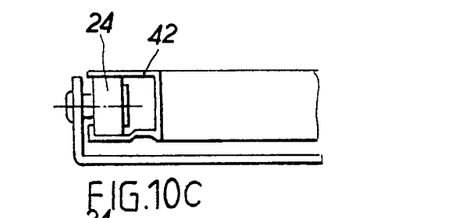
Figure 10D:
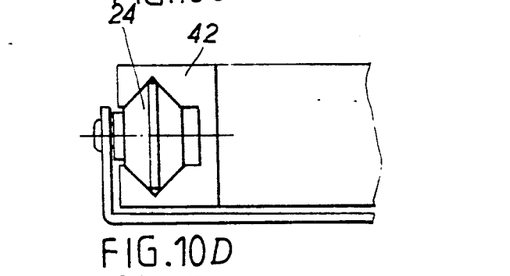
Figure 10E:
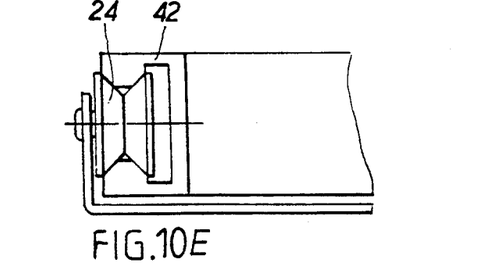
Figure 11:
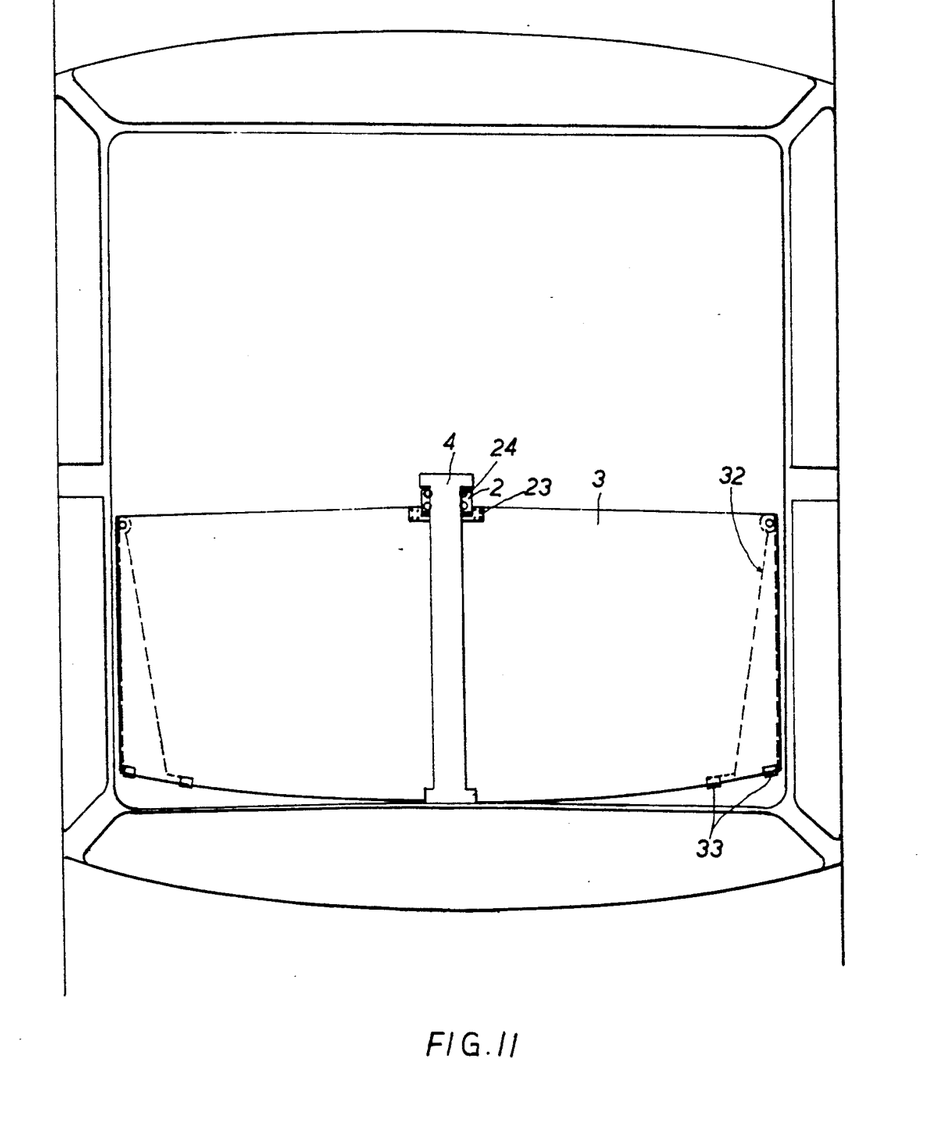
FIG. 11 is a top view of the present glare shading board.
Figure 12:
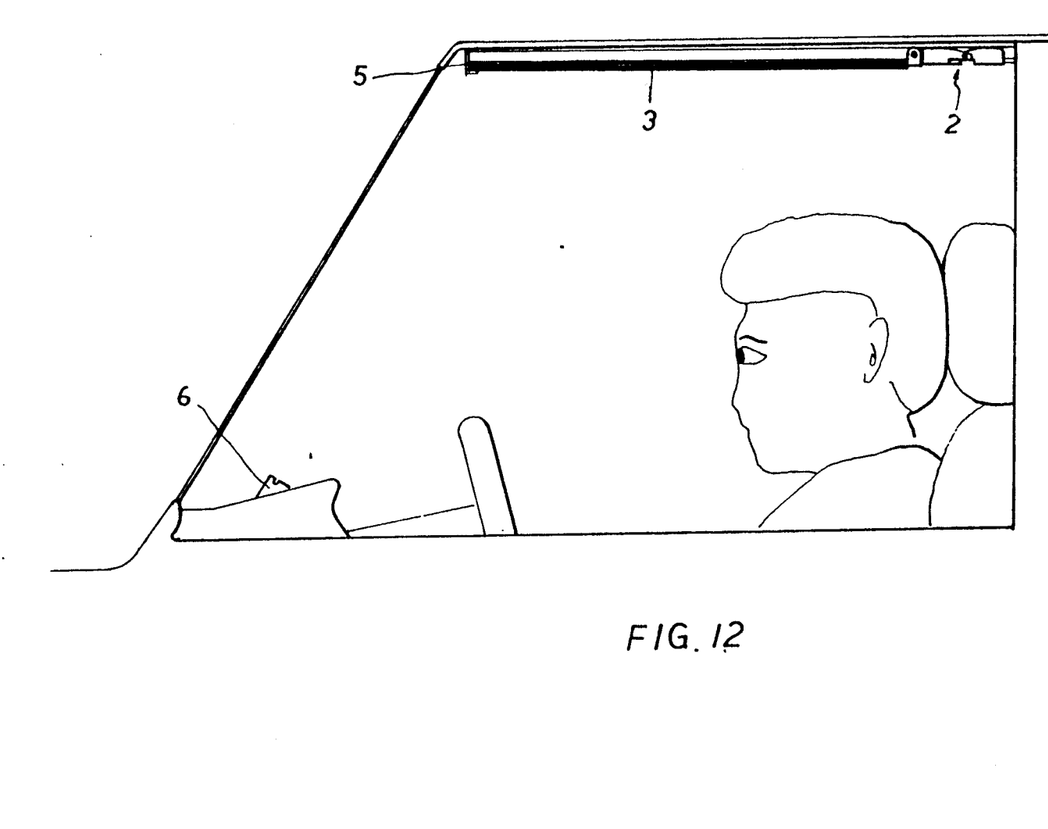
FIG. 12 is a diagram showing the present glare shading board being received at the ceiling of a vehicle.
Figure 13:
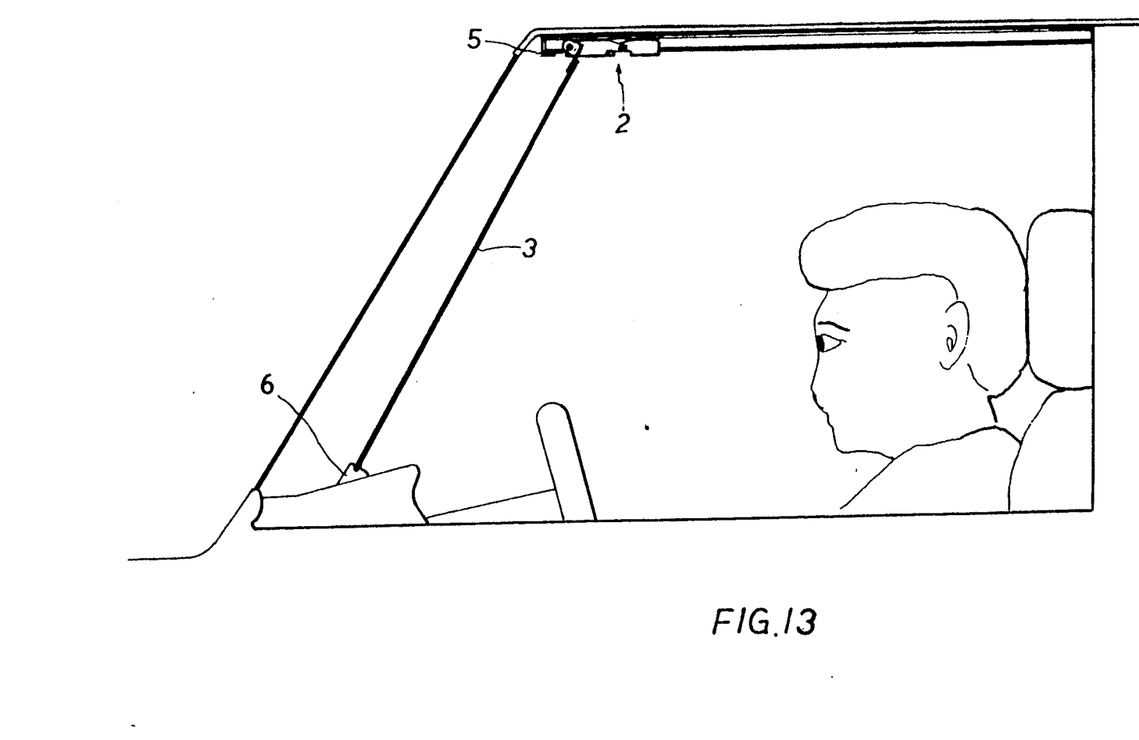
FIG. 13 is a diagram showing the board being in use.

To assemble the present invention, the glare shading board 3 is first attached to the securing plate 23, then the flexible slide plate assembly 2 is engaged with the guide bracket 4 by making the cable rollers 24 in slidable abutment against the two parallel side edges 421 of the hollow guide board 42. Each side edge 421 is made in a corresponding shape for engagement; with the cable rollers 43. In the meantime, the cable rollers 24 of the flexible slide plate assembly 2 are in limiting abutment against the cross wound cable 44 whereby the slide plate assembly 2 can be made to travel smoothly along the cable 44 and the edges 421 of the hollow guide board 42. The guide baracket 4 is then secured to the ceiling of a vehicle. An L - shaped retaining clamp 5 is disposed at the frontmost end of the guide bracket for the holding of the front edge of the glare shading board 3, as shown in FIG. 5 when the glare shading board 3 is received. A U - shaped retaining seat 6 is disposed on the top of the dashboard of a vehicle so as to pemit the frontmost edge of the glare shading board 3 to be fixed in place when the same is in use, as shown in FIG. 13. The glare shading board 3 is able to be smoothly pulled forward for use and pushed backward for reception when not used, as shown in FIGS. 5, 11, 12 and 13. Referring to FIGS. 2, 8, 9, the right - angled horizontal stop flange 221 of the flexible slide plate assembly 2 can be modified into a vertical supporting wall 222 with the resilient abutment piece 211 also modified into the same vertical supporting wall 212 having a mounting rod 213 disposed at the center thereof unto which a spring 214 can be located. The spring 214 is used to abut against the two vertical supporting walls 212, 222 whereby the flexible slide plate assembly 2 can be flexibly operated.

Referring to FIGS. 10A-10E, cable rollers 24 can be made to have the different geometric configuration which correspond to the side edges 421 of the hollow guide board 42, as shown in these figures.

It can be clearly seen that the present invention is space saving and easy to operate and can prevent a driver from hitting the sliding track secured on the ceiling of a vehicle with his or her head. Furthermore, the present invention can be mounted to a curved ceiling of a vehicle and operate thereon smoothly without getting stuck. A single glare shading board of the present invention facilitates the location and retraction of the same in actual practice.

I claim:

1. An improved ceiling mounted retractable glare shading board for an automobile, comprising:
    a) a flexible side plate assembly including a pair of guide plates, a recessed cut provided on a first side of each guide plate, and a pair of hinge pins pivotally coupling the guide plates together;
    b) a board securing plate pivotally secured to one of the guide plates;
    c) a cable roller disposed at each of two corners on a second side of each guide plate;
    d) a resilient abutment means disposed between the cable rollers on the guide plates for preventing the guide plates from pivoting upwardly about the hinge pins;
    e) a glare shading board including a main board detachably secured to the board securing plate and a pair of pivotal side wings secured to opposite ends of the main board; and
    f) a guide bracket including an upper fixing board and a lower fixing board, a hollow guide board disposed between the upper and lower fixing boards, a plurality of pulleys disposed between the upper and lower fixing boards and positioned adjacent a plurality of corners thereof, a cable cross wound around the pulleys, the hollow guide board including a pair of side edges in rolling engagement with the cable rollers.

2. The shading board of claim 1 wherein the resilient abutment means includes:
    a) a resilient abutment piece disposed at each of two corners of one of the guide plates; and
    b) a right angled horizontal stop flange disposed at each of two corners of the other guide plate.

3. The shading board of claim 1 wherein the resilient abutment means includes:
    a) a first vertical wall disposed at each of two corners of one guide plate;
    b) a second vertical wall disposed at each of two corners of the other guide plate; and
    c) a spring engaged by each pair of first and second vertical walls.

4. The shading board of claim 1 wherein the pair of side edges of the hollow guide board and the cable rollers are of corresponding geometric configurations.

5. The shading board of claim 1 wherein each side wing is of a triangular configuration including a pinnacle defining a fixed pivot point, an extended leg at a bottom portion thereof, a first retaining clamp secured to the extended leg, and a second retaining clamp secured to each of two corners of the main board for permitting the pivotal side wings and the main board to be retained together when not in use.

6. The shading board of claim 5 wherein each side wing further includes a stop flange at an outer edge thereof for limiting the pivotal movement of the side wing.

* * * * *